UNITED STATES PATENT OFFICE.

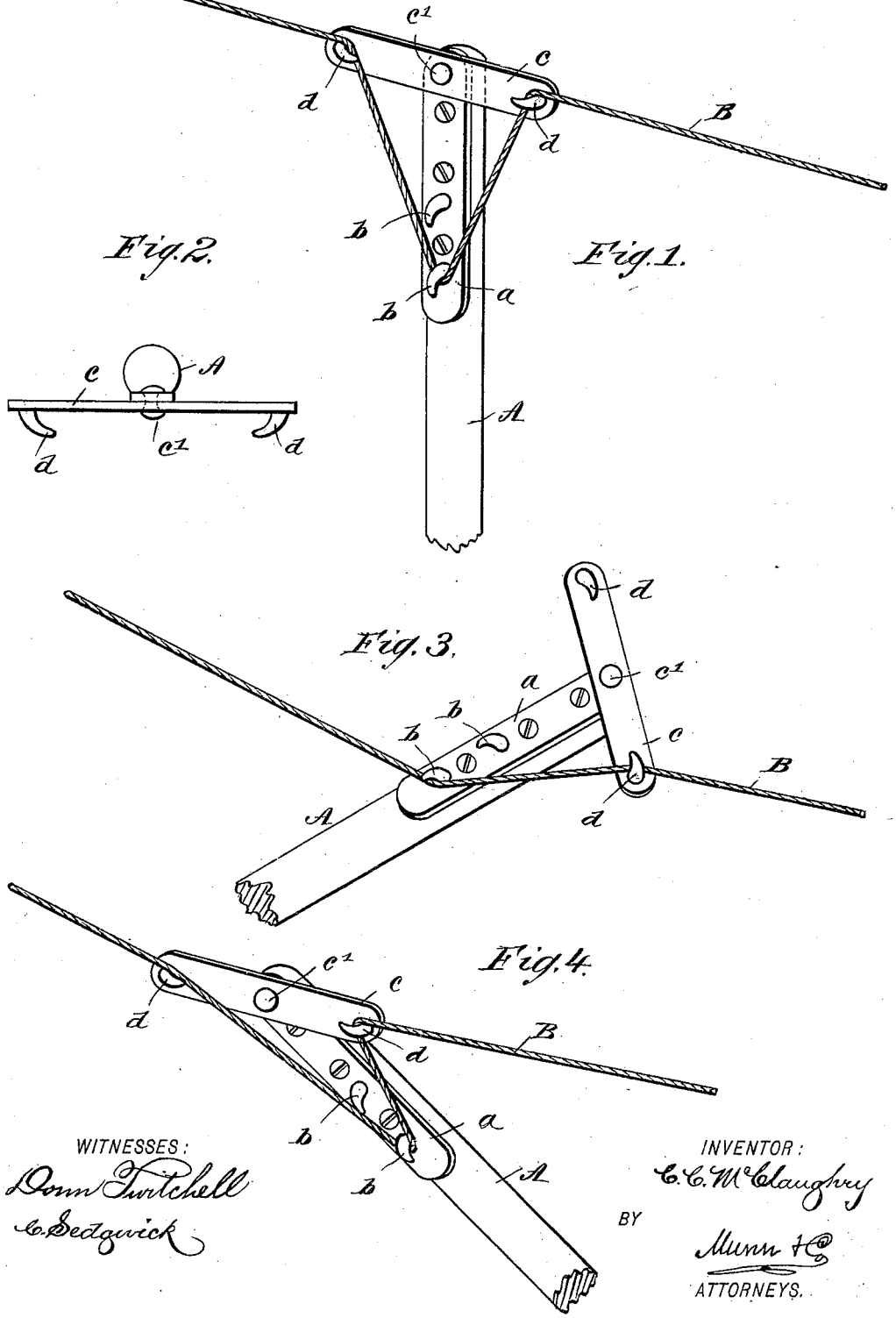

CHARLES C. McCLAUGHRY, OF JOLIET, ILLINOIS.

CLOTHES-LINE PROP AND STRETCHER.

SPECIFICATION forming part of Letters Patent No. 432,429, dated July 15, 1890.

Application filed April 24, 1890. Serial No. 349,249. (No model.)

*To all whom it may concern:*

Be it known that I, CHARLES C. MC-CLAUGHRY, of Joliet, in the county of Will and State of Illinois, have invented a new and useful Improvement in Clothes-Line Props and Stretchers, of which the following is a full, clear, and exact description.

The object of this invention is to produce a clothes-line prop which will afford means to take up different degrees of slackness in the line and retain the line in a taut condition while in service.

To this end my invention consists in certain features of construction and combination of parts, as is hereinafter described, and indicated in the claims.

Reference is to be made to the accompanying drawings, forming a part of this specification, in which similar letters of reference indicate corresponding parts in all the figures.

Figure 1 is a perspective view of the upper portion of the clothes-line prop with a line in engagement and stretched. Fig. 2 is a plan view of the line-holding attachment in position on the prop-pole. Fig. 3 is a diagram illustrating the initial movement in the application of the prop and line-stretcher to a slack line; and Fig. 4 represents the second stage of the operation, which, when completed, by placing the prop in a vertical position secures the line and stretches it, taking up the slack or looseness of the same.

The prop-pole A is preferably made of wood, round in the body, and having sufficient length to serve the designated purpose. Upon the upper end of the pole A the elongated bracket-plate $a$ is secured by screws, there being a flattened seat formed upon the side of the pole near its upper end to receive the bracket-plate, as shown. The bracket-plate $a$ is provided with two or more outwardly and downwardly projecting stout hooks $b$, which may be formed integrally upon the plate or be inserted in holes formed therein and secured to it by riveting, screw-threading, or keying, as may be preferred.

Upon the upper end portion of the bracket-plate $a$ another plate $c$ is imposed flatwise and loosely secured to said plate by a rivet, bolt, or otherwise inserted in perforations of the plates, the hole in plate $c$ being formed near its longitudinal and transverse center, as shown in Figs. 1 and 2 at $c'$, whereby the plate $c$ is permitted to lie in a horizontal plane or be vibrated therefrom. At points near each end of the rocking plate $c$ an inwardly-curved hook $d$ is formed or secured on each end portion projecting outwardly on the same side of the rocking plate at an equal distance from its pivotal center.

In placing the prop-pole so as to take up incidental slackness of the line B one of the hooks $b$ is placed over the clothes-line. The pole A is then inclined, so that the line may be engaged by one of the hooks $d$ on the rocking plate $c$, as shown in Fig. 3. The pole A is now inclined in an opposite direction and manipulated to interlock the other hook $d$ of the rocking plate $c$ with the clothes-line B, it being understood that the pole is inclined at a proper angle from the person of the operator to readily effect the hooking-connections mentioned. The pole A and attached parts will now be engaged with the clothes-line, as shown in Fig. 4, and as therein illustrated it will be seen that a loop is formed, the bight of which is over the lower hook $b$. It is only necessary now to place the pole A in an upright position to support the line B and remove all slackness due to weight of clothes on it or the difficulty incidental to stretching a line for a considerable distance between its points of support.

Having thus fully described my invention, I claim as new and desire to secure by Letters Patent—

1. A clothes-line prop and stretcher comprised of a pole, a bracket-plate fastened on the upper portion of the pole having depending hooks projected from it, and a rocking plate pivoted near its center above the hooks on the bracket-plate and furnished with hooks near its ends, substantially as set forth.

2. A clothes-line prop and stretcher comprised of a pole, a bracket-plate secured thereon near its upper end and aligning with the body of the pole, said bracket-plate having downwardly-curved hooks projecting from its lower end portion and a rocking plate which has an inwardly-curved hook on the same side near each end, and is pivoted on the upper end of the bracket-plate at the longitudinal center of the rocking plate, substantially as set forth.

CHARLES C. McCLAUGHRY.

Witnesses:
H. A. ANDERSON,
D. McDILL, Jr.